United States Patent [19]

DiGregorio et al.

[11] Patent Number: 5,078,869
[45] Date of Patent: Jan. 7, 1992

[54] CLARIFIER CLEANING APPARATUS

[75] Inventors: David DiGregorio; Brent C. Black, both of Salt Lake City, Utah

[73] Assignee: Baker Hughes Incorporated, Houston, Tex.

[21] Appl. No.: 510,896

[22] Filed: Apr. 18, 1990

Related U.S. Application Data

[63] Continuation-in-part of Ser. No. 326,143, Mar. 20, 1989.

[51] Int. Cl.[5] .................... B01D 21/20; C02F 3/14
[52] U.S. Cl. .................... 210/195.3; 210/256; 210/527; 210/926; 210/541; 198/747; 15/93.1
[58] Field of Search .............. 210/194, 195.3, 256, 210/261, 320, 519, 534, 926, 523, 525, 527, 541; 198/747; 15/93.1

[56] References Cited

U.S. PATENT DOCUMENTS

| | | | |
|---|---|---|---|
| 3,421,626 | 1/1969 | Schramm | 210/256 |
| 3,510,110 | 5/1970 | Klein | 210/926 |
| 3,846,292 | 11/1974 | LeCompte, Jr. | 210/926 |
| 4,303,516 | 12/1981 | Stensel et al. | 210/525 |
| 4,362,625 | 12/1982 | Beard | 210/521 |
| 4,383,922 | 5/1983 | Beard | 210/521 |
| 4,401,576 | 8/1983 | Meurer | 210/525 |
| 4,457,849 | 7/1984 | Beard | 210/626 |
| 4,487,692 | 12/1984 | Kersten | 210/194 |
| 4,780,206 | 12/1988 | Beard | 210/521 |
| 4,936,982 | 6/1990 | DiGregorio et al. | 210/195.3 |

FOREIGN PATENT DOCUMENTS 2075856 11/1981 United Kingdom.

OTHER PUBLICATIONS

EIMCO Equipment Catalog: EIMCO Water Treatment Equipment.
EIMCO Equipment Catalog: EIMCO Carrousel Biological Oxidation System.
"Assessment of Design Trade-Offs When Using Intrachannel Clarifiers", Jon. H. Bender, Journal WPCF, vol. 59, No. 10, pp. 871-876.

Primary Examiner—Stanley S. Silverman
Assistant Examiner—Christopher Upton
Attorney, Agent, or Firm—Rosenblatt & Associates

[57] ABSTRACT

The apparatus of the present invention is a cleaning system to be employed in the clarifier. A track is mounted to opposing sides of the clarifier. A scraping blade spans the two rails. A mechanism connects the two ends of the blade to the tracks and provides for stepwise movement of the blade bidirectionally within the clarifier. Movement of the blade over slots found in the clarifier bottom results in displacement of sludge from the clarifier back into the orbital ditch. The moving mechanisms are preferably located adjacent the clarifier floor. The scraping blade moves in stepwise motion over each of the slots, displacing sludge through such slots. At the same time a suction header, with inlets on both sides of the blade, allows some of the sludge to be suctioned from the bottom of the clarifier and removed from the orbital ditch system.

36 Claims, 7 Drawing Sheets

CLARIFIER CLEANING APPARATUS

This is a Continuation-in-Part Application of U.S. Application Ser. No. 07/326,143, filed Mar. 20, 1989, entitled "Intrachannel Clarifier", now U.S. Pat. No. 4,936,982.

FIELD OF THE INVENTION

This invention relates to a system for treating water, wastewater and other liquid-solid solutions where a clarification step is to be employed in an oxidation ditch, with a clarifier may be incorporated within the ditch confines. The invention relates to a cleaning apparatus mounted therein.

BACKGROUND OF THE INVENTION

Domestic sewage and industrial wastewater often contain impurities which include materials such as sugars and other carbohydrates and proteins and other forms of nitrogen. Many of these impurities or pollutants are decomposable by microorganisms, and there are various types of systems to remove the impurities from wastewater by action of microorganisms. One type of wastewater treatment system is known as an orbital system, sometimes referred to as an oxidation ditch system.

Orbital wastewater treatment systems include an elongated tank having two sidewalls and at least one partition wall mounted vertically in the tank substantially parallel to the two sidewalls and spaced apart from the ends of the tank. The tank and partition wall together form an endless, circuitous channel to contain a stream of mixed liquor. An orbital wastewater treatment system also includes means to cause the liquid to flow through the channel and an aerating means to introduce air into the liquid to provide oxygen for the microorganisms. Various mechanisms can be used for such purposes including a surface aerator, a rotary perforated disc-type aeration mixer, or a rotating brush aerator. Orbital wastewater treatment systems are taught, for example, in U.S. Pat. Nos. 3,510,110 and 3,846,292. According to U.S. Pat. No. 3,846,292, influent wastewater is introduced into the tank and driven to flow around the endless, circuitous channel. A stream of treated liquid, less than the total flow in the channel, is removed from the channel and transferred into a solid-liquid separator, or clarifier, spaced apart from the orbital system. In the separator, solid particles form sludge which settles, and part of the sludge is returned to the orbital system to mix with the wastewater to form mixed liquor. Clarified liquid is transferred from the separator to a stream or other body of water or sent to further treatment. The purpose of returning sludge to the orbital system is to maintain a predetermined concentration of microorganisms in the mixed liquor, thereby to accomplish biological removal of pollutants from the wastewater.

The construction of a conventional orbital system such as taught in the above patents requires that the circuitous channel be constructed and that a separate sludge separation system also be added. Additionally, a system of pipes and pumps must be installed to permit diversion of wastewater from the orbital system to the separator and for return of sludge from the separator to the orbital system.

As discussed in U.S. Pat. No. 4,303,516 (Stensel, et al.) assigned to a predecessor of applicants' assignee and as practiced in 1981 at a wastewater treatment plant at Campbellsville, Kentucky, and later at Owensboro, Kentucky, a rectangularly shaped clarifier is disposed in an orbital channel between a channel wall and partition with a frontal top weir to receive a portion of the overall mixed liquor flowing through the orbital channel. The mixed liquor portion passed down the clarifier co-currently with the main orbital channel flow into a clarifier quiescent zone. Biological sludge is settled in the clarifier for removal through ports in the clarifier bottom back in to the orbital channel mixed liquor flow and clarified liquor removed by overflow into effluent troughs alongside the partition wall and extending over a substantial length of the top of the clarifier. In the '516 patent, one embodiment employs a dipped orbital channel portion so that the orbital channel flow has substantially the same cross-sectional area throughout its length. In the Campbellsville installation, the clarifier was installed over the same channel floor elevation as the remainder of the orbital channel, and thus the remaining orbital channel flow at that location had less of a cross-sectional area than the remaining areas of the channels.

U.S. Pat. Nos. 4,362,625; 4,383,922; 4,457,849; and 4,780,206 to Beard also show intra-channel clarifiers which involve a boat-shaped structure positioned in a channel with its bow directed into the wastewater flow and providing a stern or rear inlet for entry of a portion of the wastewater flow, with that portion being flowed in the clarifier counter-currently to the channel flow at the bow of the clarifier structure. Sludge is settled in the clarifier and flows back into the channel between rows of vertical plates or through tubes. An effluent launder is positioned in a forward bow section of the clarifier structure.

Various other types of intra-channel clarifiers, including modifications of the Stensel, et al., patent and the Beard boat structure, are shown and discussed in an article entitled "Assessment of Design Trade-offs When Using Intrachannel Clarifiers" by Jon H. Bender of the U.S. Environmental Protection Agency, published in the October 1987 issue of the Journal WPCF volume 59, number 10, pages 871–876. As set forth in the article, an intra-channel clarifier must not negatively impact the mixed liquor flow velocity in the orbital channel. All intra-channel clarifiers restrict the circulating flow of mixed liquor in the aeration channel to a certain degree. Such restrictions must be minimized to maintain adequate channel velocities without requiring additional power to the aerator or other propelling means for the mixed liquor. The capability of the aeration device to overcome headlosses in the channel also must be considered.

The article also indicates that consideration must also be given to the effect of aerator channel and clarifier maintenance in an intra-channel clarifier system. Proper adjustment of sludge return flows from the clarifier to the orbital channel are also a factor. Paramount to any intrachannel clarifier is the cost-effectiveness in terms of original cost, operational (power) costs, operational manpower costs, maintenance cost, and longevity.

SUMMARY OF THE INVENTION

The invention disclosed herein results in a waste water or other liquid-solids treatment system involving a clarification operation which minimizes diminution of mixed liquor flow velocity and the headloss in the orbital channel(s) due to the presence of an intra-channel clarifier therein. The disclosed system is of a type which substantially minimizes the amount of concrete and labor required in constructing the system and utilizes the mixed liquor flow in the channel to positively force inlet flow by providing an inlet in one-half of the clarifier bow facing forward into the channel mixed liquor flow. Further, the clarifier inlet ensures that there is a diminished slower positive flow of influent in the intra-clarifier vessel. Likewise, settled sludge removal is positive since its flow rate can be controlled by the amount of mixed liquor forcibly fed into and entering the clarifier inlet over and above the flow of settled effluent.

The particular intra-channel configuration disclosed and its location relative to the sidewalls and elongated partition of an orbital channel treatment system results in a clarifier of suitable surface area and volume, while only encroaching on well less than half the full cross-sectional area of the orbital channels in which it is mounted. In one embodiment, the cross-section of the intra-channel clarifier is about 72 sq.ft. in about a 242-sq.ft. channel, thus providing only about a 30 percent encroachment, thus greatly minimizing the restriction of mixed liquor flow in a channel. It is believed that prior art intra-channel clarifiers which are placed in one channel only block out over 50 percent of the mixed liquor flow in the channel by cutting the open cross-sectional area more than 50 percent.

The above desirable results are obtained by providing an elongated top-facing notch or series of notches in the center partition between two sidewalls of the orbital ditch and positioning the clarifier in the notch(es) so that, in effect, the outer sidewalls of the clarifier function as the flow partition wall as an extension of the partition wall into the orbital channel. It is thus seen that there is an inherent saving in concrete and construction costs of the resultant smaller central partition. This construction leaves a major amount of each flow channel, particularly the outer periphery thereof, completely unimpeded by the intra-channel clarifier.

The intra-channel clarifier occupies only a relatively small fraction of the oxidation ditch channel cross-sectional area as compared to prior art devices. This causes the mixed liquor flow velocity in the channel to increase, in the area of the intra-channel clarifier, only slightly above what it is in other portions of the tank. For example, in one embodiment of the invention, the increase in velocity has been calculated as 0.3 ft/sec., whereas in prior art intraclarifiers, the increase of velocity may well be over 1 ft/sec. This aspect of the invention substantially reduces the headloss in the channel caused by the intra-channel clarifier (headloss is proportional to the square of the velocity), resulting in a reduced consumption of energy (in the form of aerator horsepower) to overcome the headloss.

The intra-channel clarifier actually straddles a lowered section of the center partition of the orbital ditch so that the respective opposite longitudinal sidewalls and a longitudinal bottom half of the clarifier each extend in cantilevered fashion from the center partition the same distance into opposed channels of the orbital ditch; i.e., the intrachannel clarifier is disposed essentially symmetrically across the central partition of the orbital ditch adjacent a midpoint of the partition.

The apparatus of the present invention is a cleaning system to be employed in the clarifier. A track is mounted to opposing sides of the clarifier. A scraping blade spans the two tracks. A mechanism connects the two ends of the blade to the tracks and provides for stepwise movement of the blade bidirectionally within the clarifier. Movement of the blade over slots found in the clarifier bottom results in displacement of a selected amount of sludge from the clarifier back into the orbital ditch. The moving mechanisms are preferably located adjacent the clarifier floor. The scraping blade moves in a stepwise motion over each of the slots, displacing a selected amount of sludge through such slots. At the same time a suction header, with inlets in close proximity to the blade, allows some of the sludge to be suctioned from the bottom of the clarifier and removed from the orbital ditch system.

DETAILED DESCRIPTION OF THE PREFERRED EMBODIMENT

Figure 1:
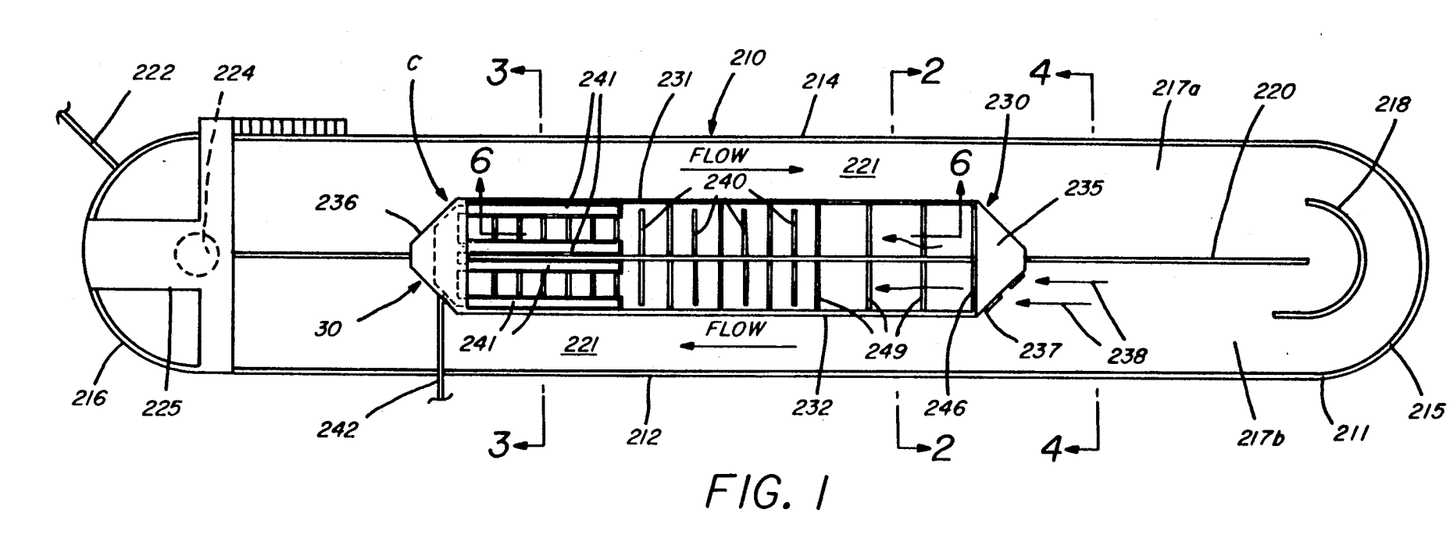
FIG. 1 is a plan view of an orbital wastewater system having the intra-channel clarifier of the invention therewithin.
Figure 2:
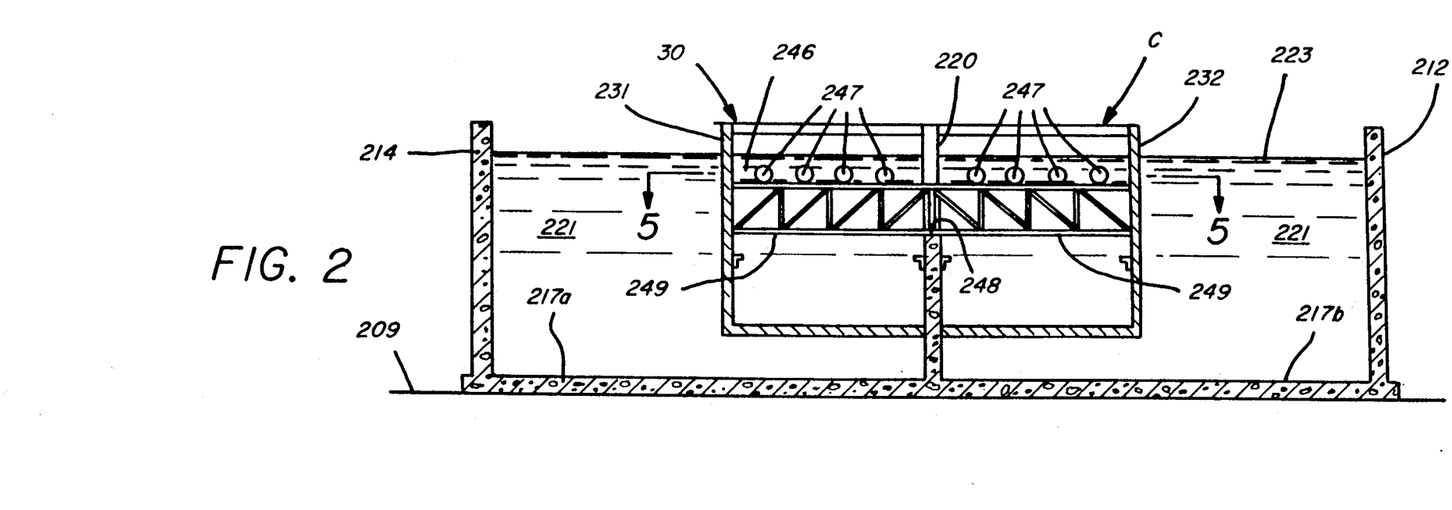
FIG. 2 is a cross-sectional view across the clarifier and the orbital ditch taken on the line 2—2 of FIG. 1.

The orbital system 210 shown in FIG. 1 includes an elongated mixed liquor holding tank 211 which has two vertical sidewalls 212 and 214 and two curved vertical or otherwise configured end walls 215 and 216 connected between opposed ends of sidewalls 212 and 214. The tank 211 has a floor shown as channel bottom 217a in a first channel reach and a channel bottom 217b in a second return channel reach. The tank is mounted normally on ground level 209. A vertical curvilinear turning wall 218 may be utilized to guide the flow of mixed liquor between the various channels. The invention may be used in various configurations of one or more orbital channels or in a freestanding clarifier or similar piece of equipment. A vertically disposed partition in the form of a wall 220 is mounted approximately equidistant between and substantially parallel to sidewalls 212 and 214 and with the partition wall ends spaced from end walls 215 and 216 so that an endless, circuitous channel 221 is formed in the tank. An inlet conduit 222 is connected to the tank to permit a wastewater mixed liquor influent to fill the tank to a desired level 223 (FIG. 2).

In the event an orbital system as taught by U.S. Pat. No. 3,510,110 is to be employed, a vertically disposed surface aerator 224 and associated drive motor (not shown) is mounted on a walkway 225 at one end of the tank adjacent curved end wall 216. The aerator includes a rotating impeller with a plurality of blades extending radially from a vertical shaft and located slightly below the wastewater surface level so that as the impeller rotates, the mixed liquor in the channel is driven to move as indicated by the FLOW arrows and the mixed liquor is agitated so that the liquor is aerated. Other means for moving and aerating the mixed liquor may be employed such as by horizontal rotating brushes positioned across a channel or bottom-mounted diffusers or standard draft tube aerators.

The clarifier C is mounted preferably in a top-facing notch (FIG. 3) of the partition 220 so that the clarifier C straddles across the partition. The clarifier can also be freestanding. Clarifier C is formed as an elongated vessel having vertical sidewalls 231 and 232, sludge exit ports 240, a bow section 235, and a closed stern section 236. One side 237 of the bow section facing into the mixed liquor flow contains a pair of vertically movable gates (FIG. 4) which are operable to control the flow of a portion (shown by arrows 238) of the mixed liquor in the circuitous channel 221 into the clarifier.

The clarifier influent portion is conducted into the clarifier at the bow section side 237 and after distribution in the clarifier (FIG. 5), flows concurrently with the mixed liquor in the return reach of channel 221. The remaining mixed liquor in the channel passes to sludge exit ports 240 and past the outside of the clarifier vessel.

Figure 3:
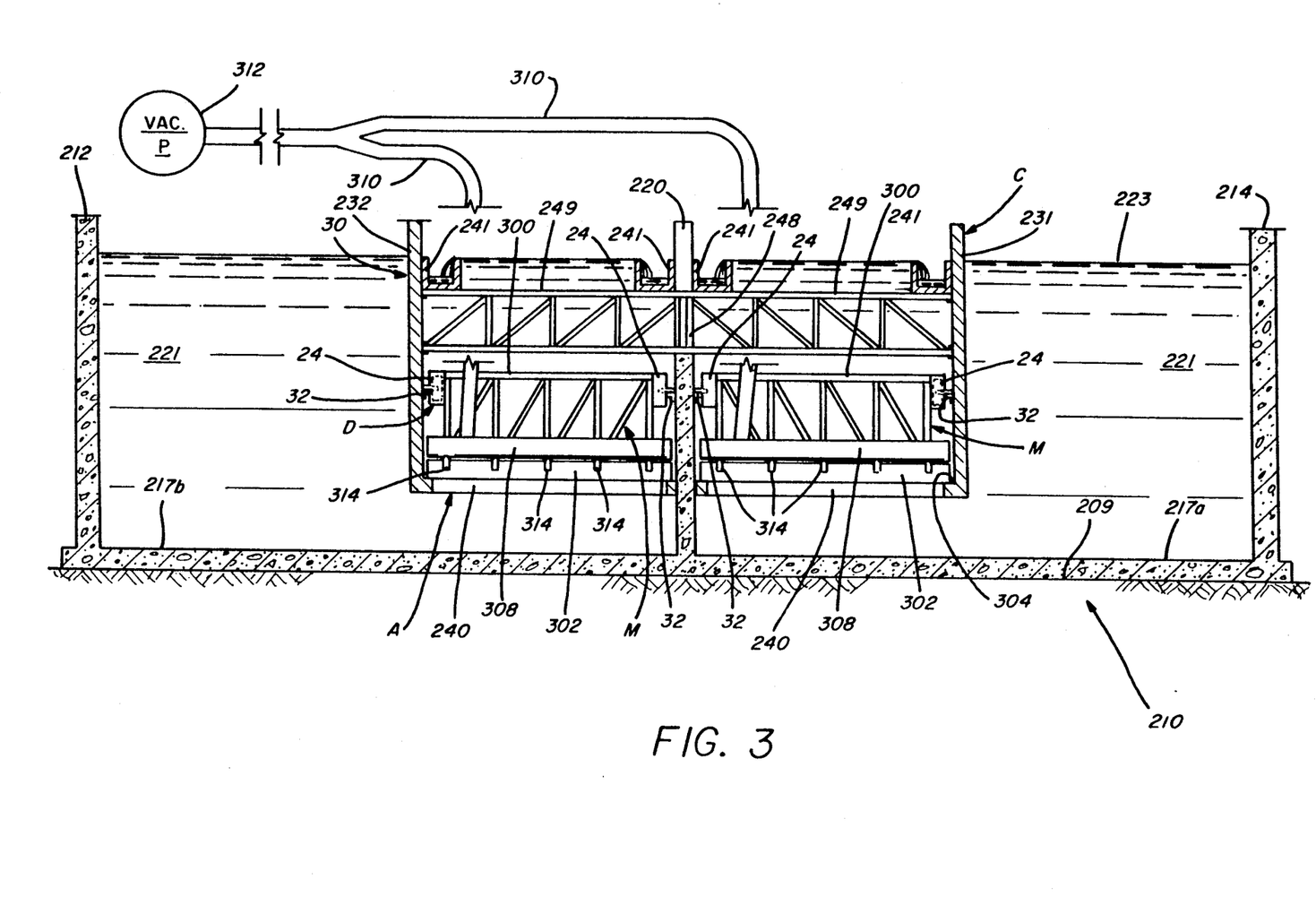
FIG. 3 is a cross-sectional view of the ditch and clarifier across the effluent troughs thereof taken on the line 3—3 of FIG. 1.

Clarification of the portion of mixed liquor takes place in the clarifier, with sludge settling out as the clarifier influent portion moves down the clarifier. A series of clarifier effluent troughs 241, as also seen in FIG. 3, are provided at the downstream end of the clarifier to remove clarified liquor through an effluent outlet 242. Scum and floating material in the clarifier may be removed by a scum system such as shown in U.S. Pat. Application 07/326,143, filed 3/20/89, and fully incorporated by reference as if actually forth herein. The sludge exit ports 240 may be cut out on three sides and the cut metal or plastic bent down as a flap to direct sludge flow into the same direction as the mixed liquor flowing therebeneath. Other types of sludge ports, such as tubes or circular bottom apertures or open troughs, may be employed. The clarifier bow section 235 includes an internal baffle 246 having spaced apertures 247 which aid in directing the mixed liquor portion flow into the main volume of the clarifier and in arresting the mixed liquor portion flowrate. Normally, the flowrate of the mixed liquor in the channel 221 is about 1.0 ft/sec., while the increased flow velocity across section 2—2, for example, will be in the range of about 1.2 to about 1.4 ft/sec.

The clarifier C is mounted on the top 248 of one or more notches in partition 220. Suitable truss or other support structures 249 may extend from the partition 220 to the sidewalls 231 and 232 so as to support and stabilize the clarifier.

Figure 4:
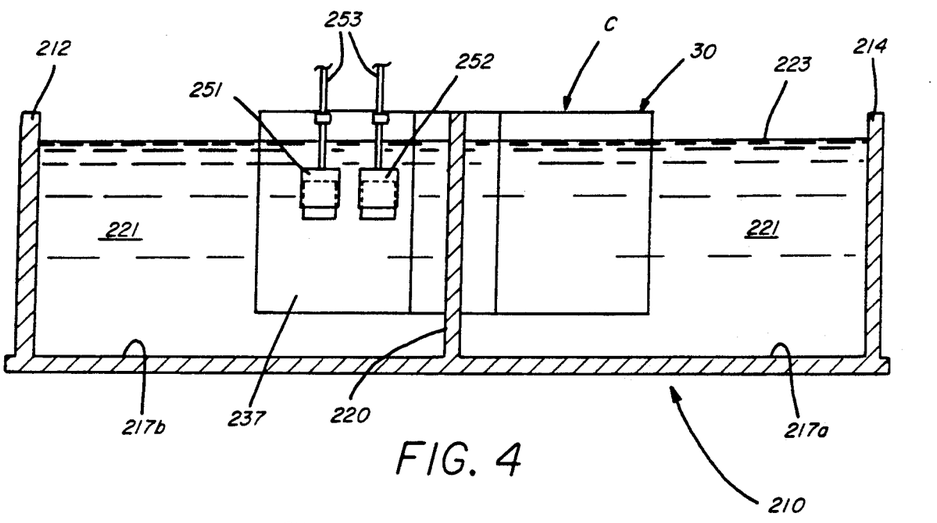
FIG. 4 is a front bow end view of the clarifier in a cross-section of the ditch taken on the line 4—r of FIG. 1.

The bow end of the clarifier C is seen in FIG. 4, including a pair of inlet gates 251 and 252 which are vertically movable into a full open or closed or intermediate position by movement of a standard screw-raising mechanism 253. The gates may comprise a flat closure plate which slides up and down within vertical retaining lips on the exterior of that part of the bow section facing the flow of mixed liquor in the channel 221. The gates 251 and 252, providing in a typical embodiment a two-foot by two-foot opening, are preferably spaced about one foot below the water level 223 so as to minimize the entry of scum or other floating matter into the clarifier. The gate maximum open area will depend on the clarification capacity of the clarifier vessel. The amount of flow coming into the vessel is approximately equal to the flow velocity of the mixed liquor times the inlet gate(s) inlet cross-sectional area. Gate 251 feeds the half of the clarifier which faces channel wall 212 while gate 252 feeds the other half of the clarifier facing channel wall 214. It is to be noted that partition 220 in FIG. 4, forward of the bow section toward channel end 215, extends at full height from the channel bottom floor to above the mixed liquor level 223 in the channel 221. Inwardly of the clarifier, the partition is notched so that there is essentially freedom of flow of the portion of the mixed liquor being clarified across the length and breadth of the clarifier.

Figure 5:
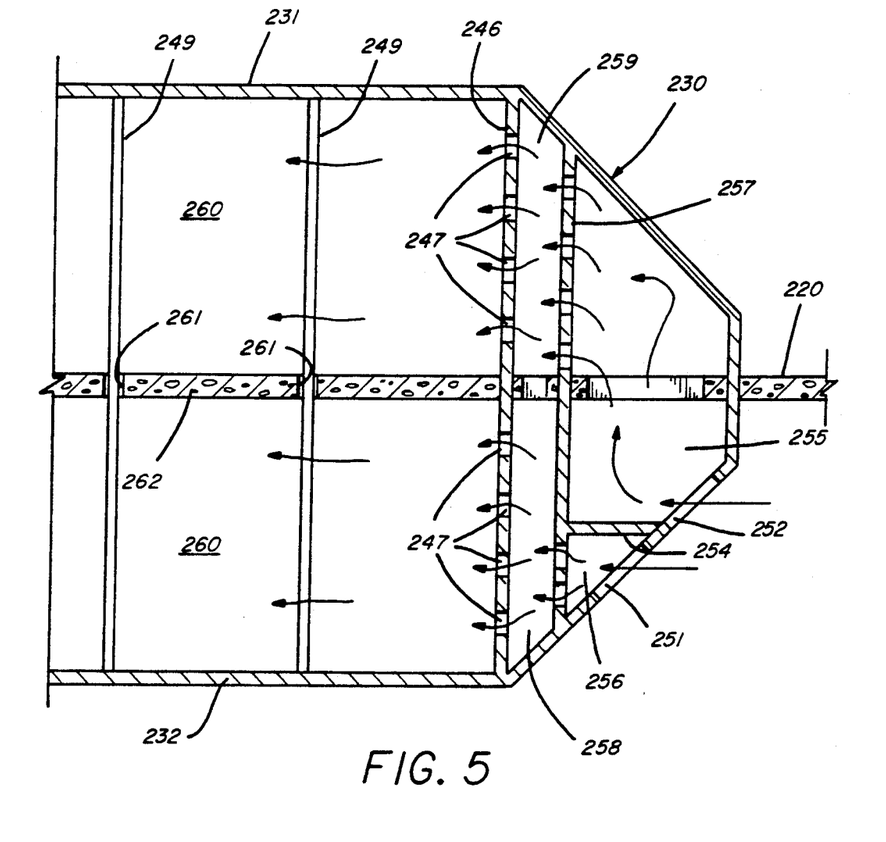
FIG. 5 is a partial plan view of the clarifier inlet end.
Figure 8:
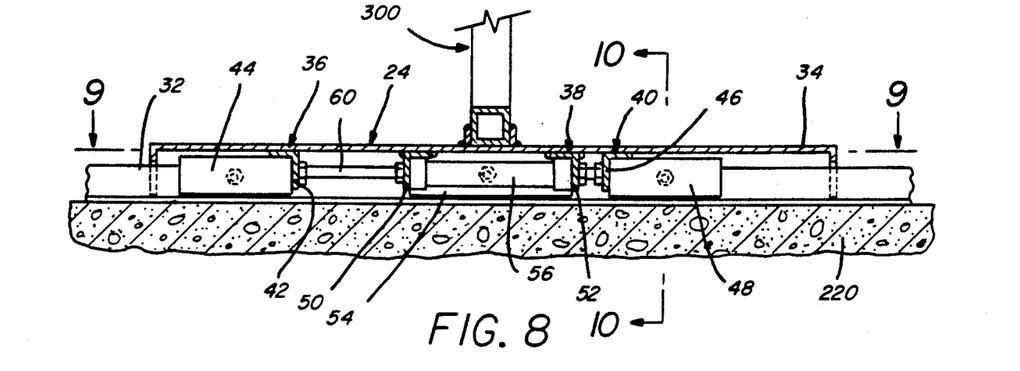
FIG. 8 is the view along line 3—3 of FIG. 7.

FIG. 5 illustrates the distribution of the influent portion of mixed liquor entering the clarifier 230 through the gates. Influent entering gate 251 passes into a chamber 256, and influent entering gate 252 passes into a chamber 255. The chambers are separated by a vertical wall 254. Each increment of mixed liquor passes through spaced apertures in a vertical baffle plate 257 into downstream chambers 258 and 259, respectively, in opposite halves of the clarifier. The partition is notched between the chambers 258 and 259 to allow crossflow. The increments of influent then pass through similar apertures 247 in parallel-spaced baffle 246, the apertures in the respective baffles being staggered so as to provide a tortuous flowpath to permit arresting the clarifier influent flowrate in a prescribed amount as discussed above. The baffles 246 and 257 extend across the width of the vessel and from the vessel bottom to above the liquid level in the vessel. The arrows show the clarifier influent flow movement into the settling zone 260 of the clarifier. In notching the partition 220, more appropriately in pouring a concrete partition, upstanding pylons 261 are formed in the partition for mounting the truss structure 249. The longitudinal bottom of the clarifier is anchored against the partition at 248 as seen in FIGS. 2, 3, and 8.

Figure 6:
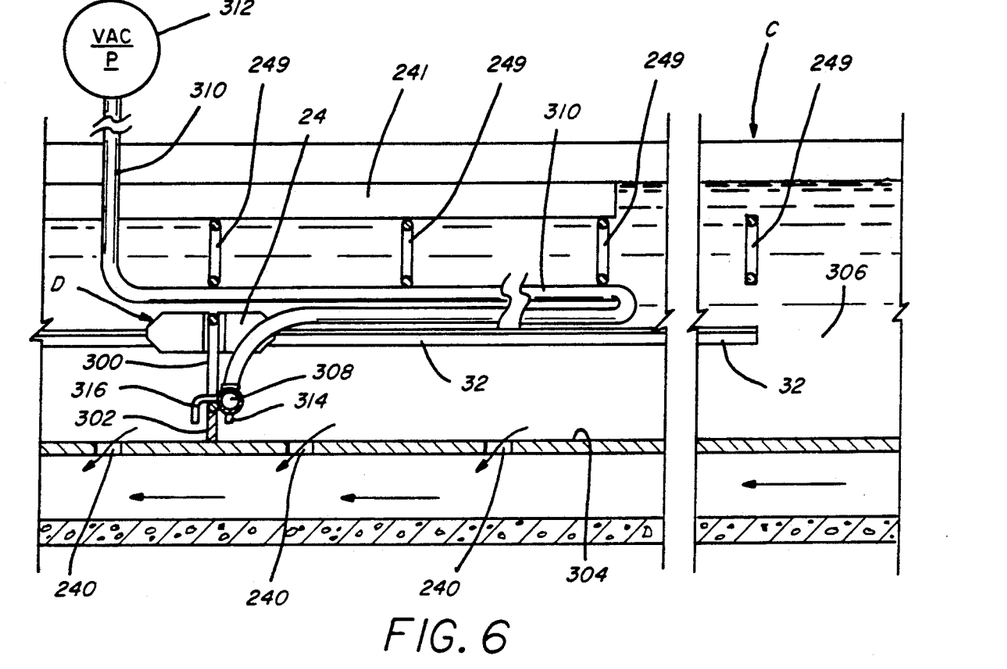
FIG. 6 is a sectional view along line 6—6 of FIG. 1.
Figure 7:
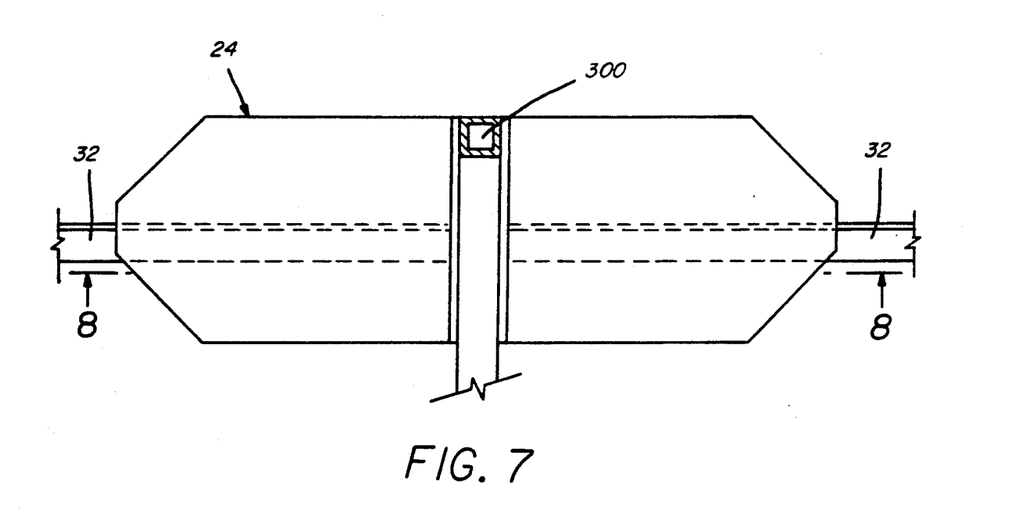
FIG. 7 is an elevational view of the driving means.

The apparatus A of the present invention comprises moving means M and driving means D, connected to the moving means M to drive the moving means in a stepping manner, as defined by movement of a portion of said driving means D relative to another portion of said driving means D (see FIG. 3). As shown in FIGS. 3 and 6, driving means D comprises a track 32 as described below. Body 24 is movably mounted to track 32. As shown in FIG. 3, track 32 is disposed on opposing walls of a clarifier. Body 24 is movably mounted to track 32 on both sides of the clarifier. The two bodies 24 are connected by a structural member shown generally as 300, which spans at least a portion of the clarifier C. It should be noted that only one drive means D can be used with a roller idler on the opposite track 32, but use of a pair of drive means is preferred. The structural member 300 can vary in design, depending upon the spans involved and the amount of sludge (not shown) anticipated to settle at the bottom of clarifier C. FIG. 3 illustrates a truss-type structural member, but other designs may be used without departing from the spirit of the invention. Connected to the underside of structural member 300 is plow 302. While FIG. 6 shows the plow to be mounted directly below structural member 300, alternative mounting methods can be employed for the plow 302. The plow 302 can be flexibly mounted to structural member 300 without departing from the spirit of the invention. The importance of structural member 300 is to give plow 302 sufficient structural rigidity as it pushes the sludge (not shown) toward sludge exit ports 240 located at the bottom 304 of clarifier C. Plow 302 moves in a stepwise manner by virtue of the drive means located within body 24. The operation of drive means D is described in more detail below. As a result of the operation of drive means D, plow 302 moves across all the sludge exit ports 240 which span bottom 304 of the clarifier C. In the preferred embodiment, the sludge exit ports 240 are open troughs which extend longitudinally over the short dimension of the clarifier, and the plow 302 is disposed in a plane parallel to all the sludge exit ports 240. Drive means D has a reversing feature which allows plow 302 to traverse the entire length of the clarifier C and then return in the opposite direction. Plow 302 is structurally mounted to support member 300 so that it is effective in plowing the sludge, regardless of the direction that the plow 302 is driven.

As shown in FIG. 6, the clarifier C can have transverse support members 249 which give structural integrity to the clarifier C shell. The track 32 is necessarily mounted below structural crossmembers 249. As shown in FIG. 6, track 32 does not extend the entire length of clarifier C. The gap 306 allows each body 24 to be mounted to and taken off track 32. In the preferred embodiment, track 32 is mounted within the clarifier C. If structural members 249 are used for reinforcing, then track 32 is mounted between the bottom 304 and structural members 249. Preferably, track 32 should be mounted high enough so that it is above the zone of sludge accumulation. However, as described below, portions of drive means D in contact with track 32 act as a wiping mechanism to wipe off any accumulated sludge which might deposit on track 32 during the operation of the clarifier C. As shown in FIG. 3, a pair of tracks 32 and drive means D operate in tandem, with structural member 300 connected therebetween. Structural member 300 can be built of tubular members with ends sealed off so that it has some buoyant properties. Any inherent buoyancy of structural member 300 reduces the downwardly exerted loads on drive means D due to the weight of structural member 300 and moving means M. Alternatively, to decrease the downwardly extending loads on drive means D, additional buoyancy can be provided in the form of ballast tanks (not shown) which create an upwardly extending force to counteract the weight of the structural member 300 and the plow 302 attached thereto.

As will be discussed below, a suction header 308 is preferably attached to the structural member 300. Suction line 310 leads from suction header 308 to a vacuum source 312, which is generally labeled as V on FIG. 3. The vacuum source can be a vacuum pump or a self-priming centrifugal pump, depending on the application. Depending upon the design of the clarifier C, more than one suction header 308 can be used (see FIG. 3), in which case additional suction lines 310 are employed to connect to vacuum source 312.

Alternatively, a multiplicity of vacuum sources 312 can be used. As shown in FIG. 6, if structural members 249 are employed within the clarifier C, suction line 310 must be sufficiently long to allow housing 24 to traverse both ends of track 32 without getting snagged on suction line 310. It should be noted that the use of structural members 249 is optional and depends upon the structural design of the clarifier. Preferably, the clarifier walls will be constructed of sufficient rigidity or will have sufficient external bracing so that the use of structural members 249 can be avoided. However, if structural members 249 are used, the length of suction line 310 in effect doubles over itself below structural members 249 when the housing 24 is in the position shown in FIG. 6. Flotation devices may be attached to line 310 to control its position as plow 302 moves.

It should be noted that suction header 308 preferably extends for substantially the entire length of structural member 300. Header 308 has a plurality of outlets 314 on one side of plow 302 and a plurality of outlets 316 on the opposite side of plow 302.

The number, size, and spacing of outlets 314 and 316 depend upon the configuration of clarifier C and the expected rate of sludge accumulation. Outlets 314 and 316 serve as means to remove sludge from the clarifier C by the selective operation of vacuum source 312. With outlets provided on both sides of plow 302, sludge can be removed with the plow 302 traversing from left to right or from right to left. Optionally, valving mechanisms can be provided to ensure that outlets 316 are blocked off when outlets 314 are open. It will be appreciated by those skilled in the art that, as an alternative, a pair of headers 308 can be employed, with one header connected to outlets 314 and the other to outlets 316. Each of the headers 308 in that event would be connected to vacuum source 312 with appropriate valving at the vacuum source to apply vacuum selectively to one header 308 or the other, depending upon the direction of movement of plow 302.

In applications using an orbital ditch with a clarifier built in, it may not be desirable to always return all of the accumulated sludge back into the orbital ditch through sludge exit ports 240. It may be desirable to purge some of the sludge from the system during the operation of the orbital ditch. Accordingly, the vacuum source 312 can be employed in conjunction with suction header 308 and outlets 314 or 316 to pick up sludge from clarifier C and move it to a location separate from the means to receive sludge located below sludge exit ports 240. Sludge can then be sucked out of clarifier C while it is also being plowed out through ports 240. Both rates can be simultaneously controlled by regulation of the speed of drive means D and the amount of vacuum applied to suction header 308. Those skilled in the art will also appreciate that vacuum source 312 can be either built to pass sludge sucked out of the bottom 304 of clarifier C, or suitable separating equipment will need to be placed on suction line 310 to prevent the sludge from getting into vacuum source 312 if it is of the style that cannot pass such materials.

It should be noted that the stepwise movement of housing 24, described below, also acts to shake any accumulated sludge off of structural member 300.

Placing track 32 within clarifier C has advantages over previous scraping designs employed in the prior art. Previously, the support mechanisms for the plow have been necessarily located outside of the clarifier C, with a purposeful intent of avoiding contact between the driving mechanism for the plow and the clarified media or the sludge. One of the reasons for locating the drive equipment for a scraper outside of the clarifier C is due to the presence of electrical and mechanical components and the need to keep such components from getting fouled by the clarified liquid or sludge. The placement of the drive mechanism for a scraper blade outside of the clarifier made it more difficult to solidly support any scrapers along the bottom of the clarifier. As a result, such scrapers could tend to get hung up if confronted with fairly severe sludge accumulations. The nature of the superstructure, connecting the driving mechanism for the scrapers located outside of the clarifier C to the scraper moving along the bottom, limited the amount of force which could be transmitted to such scrapers. This concept is illustrated in U.S. Pat. No. 4,303,516, which shows the scrapers supported by flimsy structural members solely at one end, with what amounts to a knee brace to try and lend support to the outer fringes of the blade. Alternatively, massive support structures for the plow were used, requiring extra concrete and reinforcing in the clarifier walls to support railroad-type rails at the top of the clarifier and the aggregate weight of the blade support superstructure and the mechanisms to drive it.

The cleaning mechanism of the present invention eliminates this inherent design weakness by giving support to plow 302 along substantially its entire length and at a point close to its point of contact with the sludge. The plow is also driven from both ends in tandem by driving means D, with an interconnecting structural member 300. Accordingly, the plow 302 can be made of a somewhat more flexible material to allow it to pass over irregularities in the bottom 304 of the clarifier, but at the same time have sufficient structural rigidity to substantially move the required amount of the accumulated sludge through sludge exit ports 240. It should be noted that with the use of the cleaning mechanism as shown, any deflecting panels below sludge exit ports 240 can be eliminated. These deflecting panels used in the prior art have served to constrict the bottom openings with the intended function of directing sludge flow direction. They sometimes caused plugging. Those skilled in the art can appreciate that fouling of the sludge exit ports 240 can result in accumulation of sludge build-up on bottom 304 and cause a shutdown of the clarifier.

The apparatus of the present invention, as described in more detail below, has a drive means D which positively engages track 32 to provide for improved traction along track 32 and a greater force transmitted to plow 302 to push accumulated sludge through the sludge exit ports 240. Additionally, drive means D is operable in a completely pneumatic design and, therefore, can be easily built to be installed submerged completely in liquid. This, again, is a departure from prior designs where it has been advantageous to locate drive mechanisms out of the clarified liquid for maintenance and explosive hazards. Locating the drive means D within the clarifier C also permits the use of smaller components since the driving force generated by drive means D is that much closer to the plow 302.

It is within the spirit of the invention to use the vacuum source 312 without plow 302 to selectively purge sludge from the clarifier to some separate location other than a receiving container under sludge exit ports 240.

To do this, plow 302 would require a retraction means (not shown) to pull it away from ports 240 as it is driven across the clarifier. Alternatively, the vacuum source 312 can be employed in tandem with the plow 302 to suck up sludge from the bottom 304 of clarifier C and return the sludge back to a receiving container mounted below sludge exit ports 240. Finally, plow 302 can be used without vacuum source 312.

While it has been shown to use the clarifier C in an orbital ditch by mounting it on a central wall, it is within the purview of the invention to use the cleaning apparatus for the clarifier in a clarifier which is mounted in a flow channel of an orbital ditch or in a stand-alone clarifier.

Figure 9:
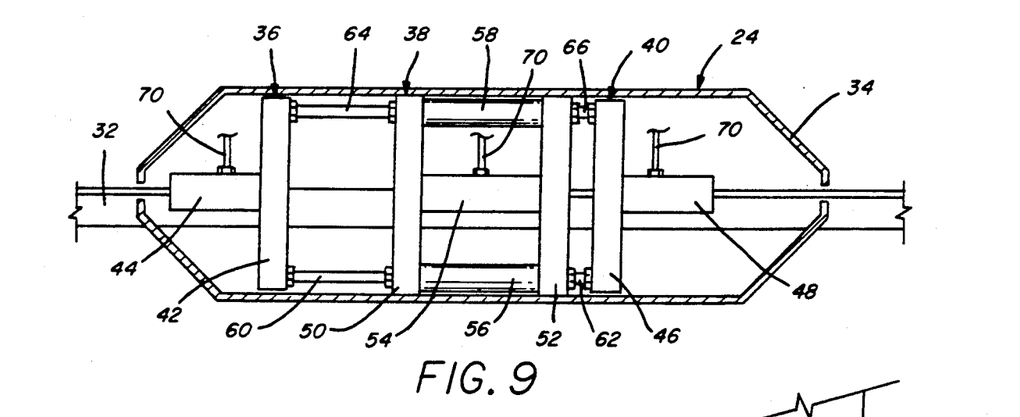
FIG. 9 is a top plan section, taken along line 4—4 of FIG. 8, showing further details of the three body members.

As shown in FIGS. 8 and 9, drive means D further includes a housing 34, first body member 36, second body member 38, and third body member 40. The housing 34 surrounds and contains the three body members 36, 38, and 40. The first body member 36 includes a cross member 42 and a slide member 44 integrally joined to the cross member 42, as seen in FIG. 9. Similarly, the third body member 40 includes a cross member 46 and a slide member 48 integrally joined to the cross member 46. Positioned between first and third body members 36 and 40 is the second body member 38, comprising frame members 50 and 52 and slide member 54. The slide member 54 interconnects the two frame members 50 and 52. The slide members 44 and 48 are connected to the midportions of the cross members 42 and 46, while the slide member 54 is connected to the midportions of frame members 50 and 52.

First body member 36 is joined to second body member 38 by an interconnecting mechanism including a pair of cylinders 56 and 58. First cylinder 56 extends between frame members 50 and 52, and is attached thereto at opposite ends of first cylinder 56. First cylinder 56 has a pair of piston rods 60 and 62. Each piston rod 60 and 62 is retractable within the first cylinder 56, as well as extendable out of an end of first cylinder 56. The outer end of piston rod 60 is fastened to cross member 42 of first body member 36 adjacent a first side of the cross member 42. The outer end of the piston rod 62 is fastened to cross member 46 of third body member 40 adjacent a first side of cross member 46. The inner ends of the piston rods 60 and 62 are connected to a common piston (not shown) contained within first cylinder 56.

Likewise, second cylinder 58 extends between frame members 50 and 52 and is attached to the sides of the frame members 50 and 52, opposite those sides to which first cylinder 56 is connected. The second cylinder 58 has a pair of piston rods 64 and 66. Each piston rod 64 and 66 is retractable within the second cylinder 58, as well as extendable out an end thereof. The outer end of the piston rod 64 is fastened to cross member 42 of first body member 36 adjacent a second side of the cross member 42. The outer end of the piston rod 66 is fastened to cross member 46 of third body member 40 adjacent a second side of the cross member 46. The inner ends of the piston rods 64 and 66 are connected to a common piston (not shown) contained within second cylinder 58.

Figure 10:
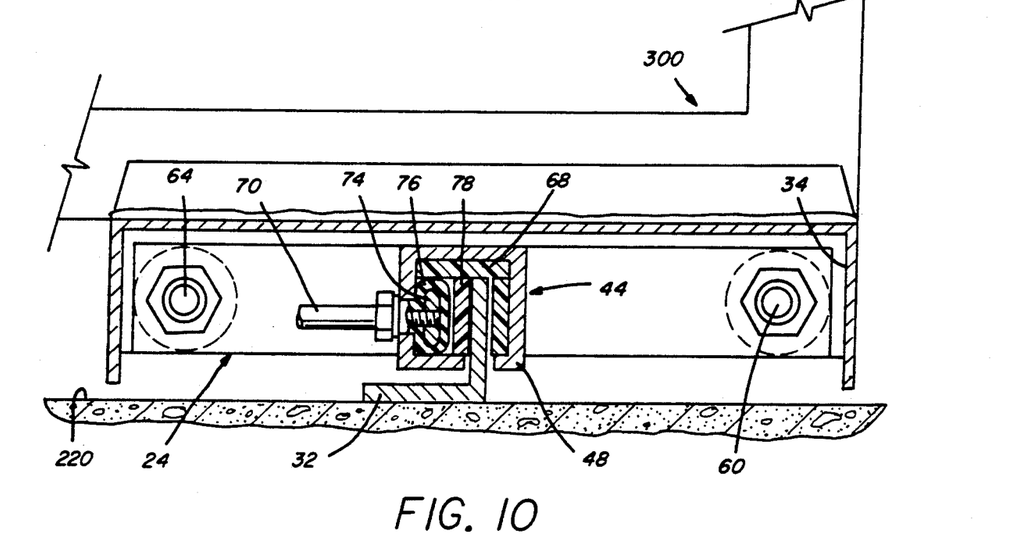
FIG. 10 is an enlarged, fragmentary, lateral section, taken along line 5—5 of FIG. 8, illustrating a clamping member housed within a slide member.
Figures 11, 12:
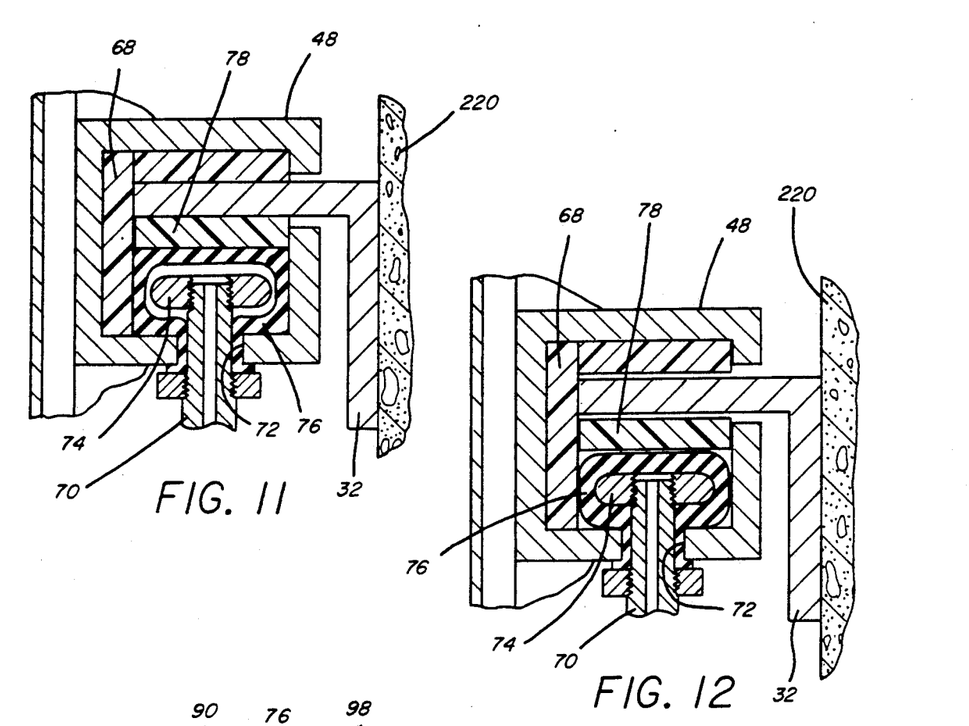
FIG. 11 is a greatly enlarged, fragmentary, lateral section, taken along line 6—6 of FIG. 8, illustrating operation of a clamping member for gripping the track and preventing movement of the third body member.
FIG. 12 is a lateral section similar to FIG. 11, showing the clamping member deactivated to permit movement of the third body member.
Figure 13:
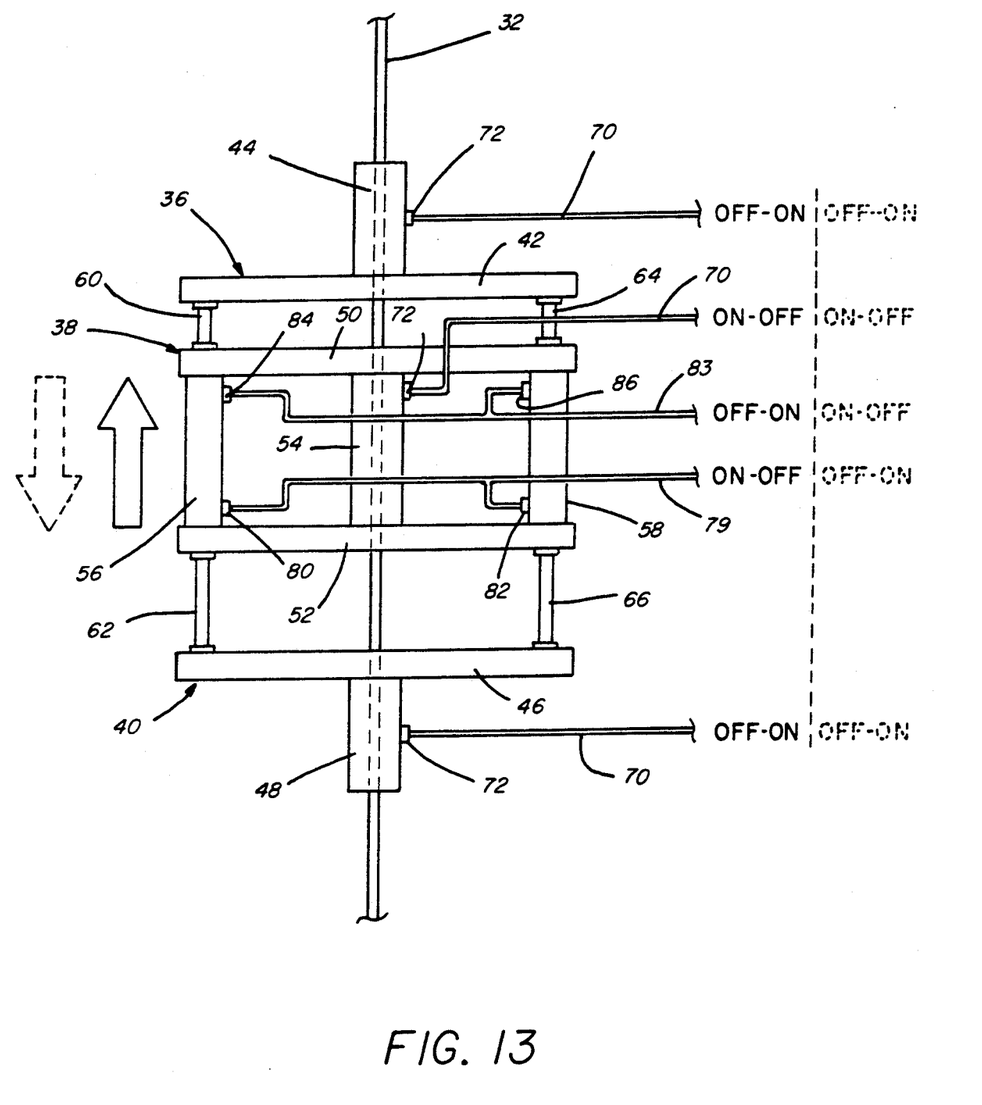
FIG. 13 is a top plan diagrammatic view of the three body members, illustrating movement thereof depending upon the application of pressurized fl ids.

Fixably fitted within the hollow interior of each of the slide members 44, 48 and 54 is a contact member 68, which the track 32 engages as the collecting device moves along the track 32. The contact member 68 contained within slide member 44 is depicted in FIG. 10 while the contact member 68 of third body member 40 is shown in FIGS. 11 and 12. The contact member 68 is typically made of a strong plastic and is held against two of the inner walls of a slide member. Securely connected to each slide member 44, 48 and 54 is also a pressure brake line 70 which is received in a brake opening 72 formed in each slide member 44, 48 and 54, as represented in FIG. 13. The pressure brake line 70 carries pressurized fluid to its corresponding brake opening 72, as will be subsequently discussed. Each pressure brake line 70 is of sufficient length so that the assembly is movable along the entire extent of the track 32.

In addition, a track clamping mechanism is positioned within each slide member 44, 48 and 54. Each clamping mechanism includes a rigid, generally rectangular bar 74 surrounded by a diaphragm 76. The bar 74 has a threaded opening. Correspondingly, the diaphragm 76 has an opening aligned or coaxial with the bar opening. A threaded end of the pressure brake line 70 is tightly held in the threaded bar opening to connect the pressure brake line 70 to the clamping mechanism.

The clamping mechanism further includes a brake pad 78 held adjacent the diaphragm 76 within each slide member 44, 48 and 54 for engagement with the diaphragm 76. The pressure brake line carries pressurized fluid so that the fluid can exit into the diaphragm 76. As illustrated in FIG. 11, pressurized fluid is contained in the diaphragm 76. As a result, the diaphragm 76 expands and pushes against the brake pad 78. In turn, the brake pad 78 engages the track 32 so that the slide member 48 is thereby clamped or braked on the track 32, for purposes to be discussed later. FIG. 12 illustrates the workings of the clamping mechanism when the pressurized fluid is no longer present in the diaphragm 76. As can be seen, the track 32 is no longer clamped between the brake pad 78 and the contact member 68. Consequently, the slide member 48 is free to move along the track 32 when the collecting device is driven.

The operation of the sediment-collecting device is illustrated diagrammatically in FIG. 13. As stated previously, the device is capable of a reciprocating, stepping movement. A description of the stepping movement in a first direction (illustrated by the solid line arrow of FIG. 13) is given first. For explanation purposes, it is assumed that the first body member 36 is immediately adjacent second body member 38 so that the piston rods 60 and 64 are retracted within first cylinder 56 and second cylinder 58, respectively. In order to move first body member 36 away from second body member 38 or in the direction illustrated by the solid line arrow, no pressurized fluid is provided to the clamping mechanisms of slide member 44 and 48. The clamping mechanism of slide member 54 is then activated by providing pressurized fluid through pressure brake line 70 and brake opening 72 to the diaphragm 76 housed therein. As a result, the second body member 38 is held fixed or braked upon the track 32. Next, pressurized fluid is provided to both first and second cylinders 56 and 58 through pressure drive line 79 and drive openings 80 and 82. Pressure drive line 79 carries pressurized fluid to the cylinders 56 and 58 for use in driving the device. Drive openings 80 and 82 are formed in the cylinders 56 and 58 at first ends thereof adjacent frame member 52 of second body member 38. The pressurized fluid against the pistons within the cylinders 56 and 58 forces the piston rods 60 and 64 outwardly of the cylinders 56 and 58, while the second body member is held fixed to thereby move or slide first body member 36 along the track 32 relative to and away from the second body member 38. Since piston rods 62 and 66 are connected to the common piston to which piston rods 60 and 64 are also connected, third body member 40 moves in a direction towards second body member 38.

After the piston rods 60 and 64 have reached their fullest outer extent with respect to the second body member 38 or where third body member 40 is immediately adjacent second body member 36, the clamping mechanisms of slide members 44 and 48 are activated by means of the application of pressurized fluid thereto through their respective pressure brake lines 70 and brake openings 72. The clamping mechanism of slide member 54 is released. Next, pressurized fluid is provided to both cylinders 56 and 58 through drive line 83 and drive openings 84 and 86. Pressure drive line 82 carries pressurized fluid to the cylinders 56 and 58 for use in driving the device. Drive openings 84 and 86 are formed in the cylinders 56 and 58 at second ends thereof adjacent frame member 58 of second body member 38. The pressurized fluid against the pistons in the cylinders 56 and 58 through these drive openings 84 and 86, while first body member 36 and third body member 40 are clamped to the track 32, results in a force which pulls second body member 38 in the direction of the first body member 36 to retract piston rods 60 and 64 within their respective cylinders 56 and 58, while moving second body member 38 along the track 32 relative to and towards first body member 36. Second body member 38 moves until it contacts first body member 36. The piston rods 62 and 66, connected to third body member 40, are extended outwardly from their respective cylinder ends during this movement of the second body member 38.

After the second body member 38 is immediately adjacent the first body member 36, that is to say, the piston rods 60 and 64 are retracted within the cylinders 56 and 58, the foregoing process just described is repeated. The movement of the collecting device in the first direction continues for a predetermined time, normally, until the collecting device reaches a wall of the vessel 16. In order to move the collecting device in a second direction, opposite the just described first direction, a similar operation is used. Assuming that second body member 38 is immediately adjacent first body member 36 and first body member 36 is essentially adjacent the vessel wall, the clamping mechanisms of slide member 44 and 48 are activated to hold first and third body members 36 and 48 fixed to the track 32. Pressurized fluid is removed from the clamping mechanism of the second body member 38. Pressurized fluid is then provided through pressure drive line 79 and drive openings 80 and 82 to the first and second cylinders 56 and 58. The force against the piston in the two cylinders 56 and 58 moves the second body member 38 along the track 32 in a second direction or towards third body member 40.

After second body member 38 is moved immediately adjacent third body member 40, the clamping mechanisms of slide members 44 and 48 are disengaged by removal of the pressurized fluid applied thereto. The clamping mechanism of slide member 54 is activated by means of pressurized fluid. Subsequently, pressurized fluid is provided through pressure drive line 83 and drive openings 84 and 86 of first and second cylinders 56 and 58. Force of the fluid moves the piston rods 62 and 66 outwardly of the cylinders 56 and 58 while piston rods 60 and 64 are retracted within the cylinders 56 and 58.

After the piston rods 62 and 66 have reached their fullest outer extent with respect to the second body member 38 or where first body member 36 is immediately adjacent second body member 38, the foregoing described process is repeated until the collecting device is moved for a predetermined time in the second direction.

The state or condition of the pressurized fluid sent to the slide members 44, 48 and 54 and cylinders 56 and 58 for proper working operation of the device is provided adjacent the pressure brake lines 70 and pressure drive lines 79 and 83 depicted in FIG. 13. ON indicates that pressurized fluid is being applied, while OFF indicates that pressurized fluid is not being applied. The first column of the first pair of columns represents the state of the pressurized fluid when the first body member 36 and the third body member 40 are being moved in the first direction (solid line arrow). The second column of the first pair of columns represents the state of the pressurized fluid when the second body member 38 is being moved in the first direction (solid line arrow).

The first column of the second pair of columns represents the state of the pressurized fluid when the third body member 40 and first body member 36 are being moved in the second direction (dashed line arrow). The second column of the second pair of columns represents the state of the pressurized fluid when the second body member 38 is being moved in the second direction (dashed line arrow).

Figure 14:
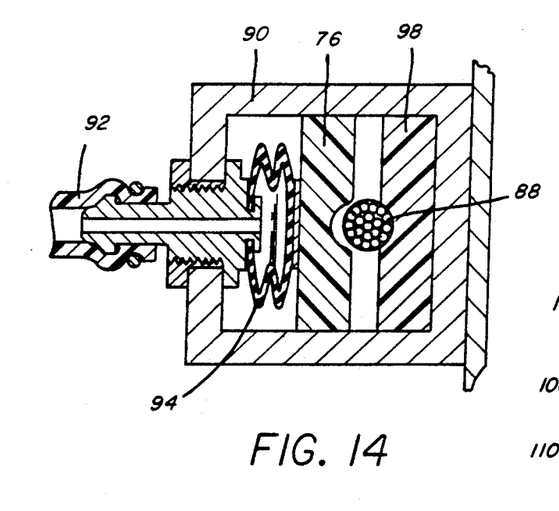
FIG. 14 is a lateral section showing another embodiment for clamping a body member by gripping a cable along which the body member moves.
Figure 15:
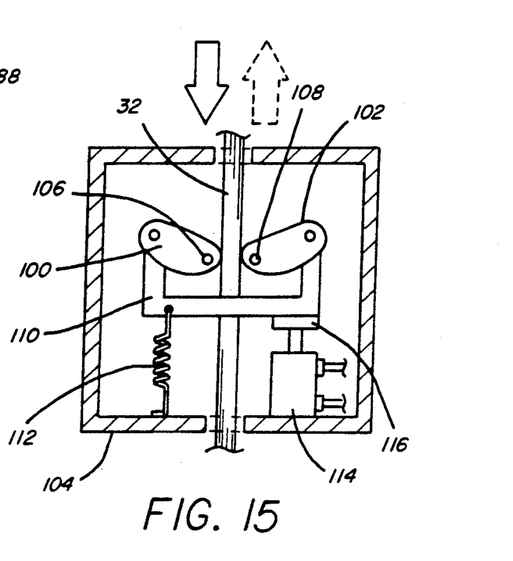
FIG. 15 is a top plan section of another embodiment for clamping a body member to a track.

Referring to FIGS. 14-15, different embodiments of the clamping mechanism of the present invention are provided. In FIG. 14, a cable 88 is substituted for the track 32. Unlike the slide members 44, 48 and 54, slide member 90 has no opening formed at its bottom to receive a track 32. The cable is supported within the clarifier to be received within the hollow interior of the slide member 90. Pressure brake line 92 is connected to the slide member 90 and carries pressurized fluid to a bellows 94. Upon delivery of pressurized fluid, the bellows 94 expands and forces brake show 96 against the cable 88. The cable 88 then also engages brake shoe 98 so that slide member 90 is clamped to the cable 88. In the absence of pressurized fluid, the bellows 94 retracts and slide member 90 is no longer clamped to the cable 88 and is capable of movement therealong.

The clamping mechanism embodied in FIG. 15 includes a pair of cams 100 and 102 connected to a slide member 104 for pivotal movement about pivot pins 106 and 108, respectively. The cams 100 and 102 are positioned on opposite sides of the bottom opening of the slide member 104. The cams 100 and 102 are joined together by an interconnecting piece 110. A spring 112 attached to the interconnecting piece 110 urges the cams 100 and 102 toward the track 32. A solenoid 114 having a solenoid head 116 is positioned within the slide member 104 so that the solenoid head 116 can engage the interconnecting piece 110 when the solenoid 114 is energized.

In operation, the slide member 104 is capable of movement in the direction identified by the solid line arrow of FIG. 15. However, the slide member 104 cannot move in the direction of the phantom or dotted line arrow inasmuch as the cams 100 and 102 grip the track 32 when the slide member 104 is attempted to be moved in that direction. Once it is desirable to move the slide member 104 in the direction of the phantom line arrow, the solenoid 114 is energized s that the solenoid head 116 drives the interconnecting piece 110 and the cams 102 and 102 pivot in a counterclockwise direction away from the track 32.

The foregoing disclosure and description of the invention are illustrative and explanatory thereof, and various changes in the size, shape and materials, as well as in the details of the illustrated construction, may be made without departing from the spirit of the invention.

We claim:

1. An apparatus for removal of materials from an enclosure through at least one opening thereon, comprising:
    moving means for moving material within the enclosure towards the opening; reciprocating driving means within said enclosure connected to said moving means to drive said moving means in a stepping manner defined by movement of a portion of said driving means relative to another portion of said driving means;
    said moving means comprises a plow spanning over at least a portion of the enclosure;
    a framework substantially spanning across the enclosure to support said plow; and
    said driving means is connected at each end of said framework, close to the bottom of the enclosure, for positively driving said ends of said framework in tandem.

2. The apparatus of claim 1, further comprising:
    suction means connected to said plow for selectively removing material from the enclosure through a location other than the opening to which the material is moved by said plow.

3. The apparatus of claim 2, wherein:
    said suction means is operable independently of said driving means.

4. The apparatus of claim 3, wherein:
    said plow moves sequentially over a plurality of openings as said driving means drives said plow between opposed ends of the enclosure.

5. The apparatus of claims 1, 2, or 4, further comprising:
    brake means connected to said drive means of preventing movement of said moving means and said rive means.

6. The apparatus of claim 5, wherein said drive means comprises:
    braking means for preventing movement of a portion of said drive means with respect to another portion of said drive means; and
    a track or cable along which the apparatus moves.

7. The apparatus of claim 6, wherein said brake means comprises:
    clamping means for receiving a pressurized fluid, said clamping means being held in said drive means and changing in volume to clamp portions of said drive means against the track or cable to prevent movement of said portions of said drive means.

8. The apparatus of claim 7, wherein said clamping means comprises:
    a bar having an opening;
    a diaphragm surrounding said bar and having an opening aligned with said bar opening; and
    a brake pad adjacent said diaphragm which engages said track or cable to prevent movement of said portions of said drive means whenever a pressurized fluid is provided to said diaphragm through said opening thereof.

9. The apparatus of claim 8, wherein said clamping means further comprises:

a bellows having an opening for receiving a pressurized fluid, upon receipt of said pressurized fluid, said bellows changing in volume for use in preventing movement of said portions of said drive means.

10. The apparatus of claims 1, 2, or 4, wherein said drive means provides only linear motion.

11. The apparatus of claims 1, 2, or 4, wherein said drive means further comprises:
a first body member;
a second body member connected to said first body member;
a third body member connected to said second body member;
first means for connecting said first body member to said second body member, at least portions of said first means being extendable relative to said second body member in a first direction to move said first body member relative to said second body member; and
second means for connecting said second body member to said third body member, at least portions of said second means being extendable relative to said second body member in a second direction to move said third body member relative to said second body member.

12. The apparatus of claim 11, wherein:
translation is defined by the movement of said first and third body members relative to said second body member.

13. The apparatus of claim 11, wherein:
said translation is defined by the movement of said second body member relative to said first and third body members.

14. The apparatus of claim 11, wherein:
at least portions of said first means is retractable with respect to said second body member to move said second body member relative to said first body member.

15. The apparatus of claim 14, wherein said first means comprises:
cylinder means having opposing ends and connected to said second body member, said cylinder means having an opening adjacent each of said ends for receiving a pressurized fluid;
rod means connected to each of said ends of said cylinder means for reciprocating movement inwardly and outwardly of said cylinder means; and
piston means within said cylinder means and connected to each of said rod means so that, when pressurized fluid is provided to said cylinder means through at least one of said cylinder means openings, said piston means and said rod means are driven in a predetermined direction.

16. The apparatus of claims 1, 2, or 4, wherein said drive means further comprises:
a first body member including a slide member positioned on the track, said slide member having an opening to receive a pressure brake line for carrying pressurized fluid, said first body member further including clamping means connected to said pressure brake line;
a second body member including a slide member positioned on the track, said slide member having an opening to receive a pressure brake line for carrying pressurized fluid, said second body member further including clamping means connected to said pressure brake line;
a third body member including a slide member positioned on the track, said slide member having an opening to receive a pressure brake line for carrying pressurized fluid, said third body member further including clamping means connected to said pressure brake line;
a first cylinder having two ends and being fastened to said second body member and a second cylinder having two ends and being fastened to said second body member, each of said first and second cylinders having a pair of openings adjacent said ends of said first and second cylinders, each of said first and second cylinder openings receiving pressure drive lines for carrying pressurized fluid, said first body member being moved relative to said second body member after pressurized fluid is provided to said second body member clamping means through said pressure brake line thereof and when pressurized fluid is provided through one of said pressure drive lines to said first and second cylinder openings located adjacent said third body member.

17. The apparatus of claim 2, wherein:
said plow moves sequentially over a plurality of openings as said driving means drives said plow between opposed ends of the enclosure.

18. The apparatus of claim 1, wherein:
said moving means moves sequentially over a plurality of openings as said driving means drives said moving means, between opposed ends of the enclosure, and said drive means is mounted within the enclosure.

19. In combination with an orbital ditch comprising a pair of upstanding sidewalls spacedly separated by a upstanding partition and forming a pair of parallel channels for circuitous flow of mixed liquor;
means for forming an elongated top-facing notch in said partition;
a clarifier vessel positioned in said notch, said vessel having upstanding sidewalls and a bottom forming a vessel interior and separating said vessel interior from said channels;
said clarifier further comprising;
moving means for moving sludge found in the mixed liquor out of said clarifier and back into said orbital ditch through at least one opening in said clarifier;
reciprocating driving means within said clarifier connected to said moving means to drive said moving means in a stepping manner defined by movement of a portion of said driving means relative to another portion of said driving means;
said moving means comprises a plow spanning over at least a portion of the enclosure;
a framework substantially spanning across the enclosure to support said plow; and
said drive means is connected at each end of said framework, close to the bottom of the enclosure, for positively driving said ends of said framework in tandem.

20. The apparatus of claim 19, further comprising:
suction means connected to said moving means for selectively removing material from the clarifier through a location other than the opening to which the material is moved by said moving means.

21. The apparatus of claim 20, wherein:
said suction means is operable independently of said driving means.

22. The apparatus of claim 21, wherein:

said plow moves sequentially over a plurality of openings as said driving means drives said plow between opposed ends of the clarifier.

23. The apparatus of claims 19, 20, or 22, further comprising:
brake means connected to said drive means for preventing movement of said moving means and said drive means.

24. The apparatus of claim 23, wherein said drive means comprises:
braking means for preventing movement of a portion of said drive means with respect to another portion of said drive means; and
a track or cable along which the apparatus moves.

25. The apparatus of claim 24, wherein said brake means comprises:
clamping means for receiving a pressurized fluid, said clamping means being held in said drive means and changing in volume to clamp portions of said drive means against the track or cable to prevent movement of said portions of said drive means.

26. The apparatus of claim 25, wherein said clamping means comprises:
a bar having an opening;
a diaphragm surrounding said bar and having an opening aligned with said bar opening; and
a brake pad adjacent said diaphragm which engages said track or cable to prevent movement of said portions of said drive means whenever a pressurized fluid is provided to said diaphragm through said opening thereof.

27. The apparatus of claim 25, wherein said clamping means further comprises:
a bellows having an opening for receiving a pressurized fluid, upon receipt of said pressurized fluid, said bellows changing in volume for use in preventing movement of said portions of said drive means.

28. The apparatus of claim 19, 20, or 22, wherein said drive means provides only linear motion.

29. The apparatus of claim 19, 20, or 22, wherein said drive means further comprises:
a first body member;
a second body member connected to said first body member;
a third body member connected to said second body member;
first means for connecting said first body member to said second body member, at least portions of said first means being extendable relative to said second body member in a first direction to move said first body member relative to said second body member; and
second means for connecting said second body member to said third body member, at lest portions of said second means being extendable relative to said second body member in a second direction to move said third body member relative to said second body member.

30. The apparatus of claim 29, wherein:
translation is defined by the movement of said first and third body members relative to said second body member.

31. The apparatus of claim 29, wherein:
said translation is defined by the movement of said second body member relative to said first and third body members.

32. The apparatus of claim 29, wherein:
at least portions of said first means is retractable with respect to said second body member to move said second body member relative to said first body member.

33. The apparatus of claim 32, wherein said first means comprises:
cylinder means having opposing ends and connected to said second body member, said cylinder means having an opening adjacent each of said ends for receiving a pressurized fluid;
rod means connected to each of said ends of said cylinder means for reciprocating movement inwardly and outwardly of said cylinder means; and
piston means within said cylinder means and connected to each of said rod means so that, when pressurized fluid is provided to said cylinder means through at lest one of said cylinder means openings, said piston means and said rod means are driven in a predetermined direction.

34. The apparatus of claims 19, 20, or 22, further comprising:
a first body member including a slide member positioned on the track, said slide member having an opening to receive a pressure brake line for carrying pressurized fluid, said first body member further including clamping means connected to said pressure brake line;
a second body member including a slide member positioned on the track, said slide member having an opening to receive a pressure brake line for carrying pressurized fluid, said second body member further including clamping means connected to said pressure brake line;
a third body member including a slide member positioned on the track, said slide member having an opening to receive a pressure brake line for carrying pressurized fluid, said third body member further including clamping means connected to said pressure brake line;
a first cylinder having two ends and being fastened to said second body member and a second cylinder having two ends and being fastened to said second body member, each of said first and second cylinders having a pair of openings adjacent said ends of said first and second cylinders, each of said first and second cylinder openings receiving pressure drive lines for carrying pressurized fluid, said first body member being moved relative to said second body member after pressurized fluid is provided to said second body member clamping means through said pressure brake line thereof and when pressurized fluid is provided through one of said pressure drive lines to said first and second cylinder openings located adjacent said third body member.

35. The apparatus of claim 20, wherein:
said plow moves sequentially over a plurality of openings as said driving means drives said plow between opposed ends of the clarifier.

36. The apparatus of claim 19, wherein:
said moving means moves sequentially over a plurality of openings as said driving means drives said moving means, one between opposed ends of the clarifier, and said drive means is mounted within the clarifier.

* * * * *